United States Patent [19]
McKee

[11] Patent Number: 4,494,616
[45] Date of Patent: Jan. 22, 1985

[54] APPARATUS AND METHODS FOR THE AERATION OF CESSPOOLS

[76] Inventor: George B. McKee, 472 Bay Ave., Patchogue, N.Y. 11772

[21] Appl. No.: 514,935

[22] Filed: Jul. 18, 1983

[51] Int. Cl.³ ............................ E21B 7/18; E21B 7/20
[52] U.S. Cl. ..................................... 175/67; 175/171; 175/202; 210/170; 210/747
[58] Field of Search ................. 175/67, 171, 202, 422, 175/220; 52/160, 161, 153-159, 162-165; 405/242, 244, 248, 269; 210/747, 170, 232

[56] References Cited

U.S. PATENT DOCUMENTS

| | | | |
|---|---|---|---|
| 1,409,760 | 3/1922 | O'Marr | 175/422 |
| 2,141,034 | 12/1938 | Cummins | 52/164 |
| 2,755,734 | 7/1956 | Smith | 52/161 |
| 4,015,433 | 4/1977 | Shibata | 52/160 |
| 4,023,314 | 5/1977 | Tanner | 405/244 |

FOREIGN PATENT DOCUMENTS 836092  4/1952  Fed. Rep. of Germany ........ 52/160

*Primary Examiner*—George A. Suchfield
*Assistant Examiner*—Bruce M. Kisliuk
*Attorney, Agent, or Firm*—Leonard Belkin

[57] ABSTRACT

Apparatus and methods for the aeration of cesspools in operation. In one embodiment there is a tool for inserting the aeration device under the bottom of the cesspool. The tool comprises a central cylinder with retractable arms. The aeration device has retractable arms which attach to the tool and compressed air is supplied to the tool to facilitate its passage through and beneath the pool. The tool is then removed leaving the aeration devices in place with a line extending out of the pool to receive compressed air. Other embodiments include the method of inserting the aeration device, a system for aerating a pool, and methods for controlling the operation of the aeration device.

7 Claims, 7 Drawing Figures

APPARATUS AND METHODS FOR THE AERATION OF CESSPOOLS

BACKGROUND OF THE INVENTION

This invention relates to apparatus and methods for the aeration of cesspools and more particularly to apparatus and methods for converting a static anaerobic operating cesspool system into a dynamic, aerobic waste disposal system.

In most if not all urban and in many suburban areas of this country, liquid wastes are conveyed for disposal through networks of sewage pipes. However, in many communities involving millions of homes and places of businesses, individual cesspools are still relied upon for the ultimate disposal of such wastes. A cesspool, as understood in the art, is a container planted usually beneath the surface of the ground, open on the bottom and frequently having openings in the side walls. Liquid waste material is discharged into the container, with solid material settling on the bottom and the liquid percolating down through the solid material collected on the bottom and some liquid seeping out through the side walls. A cesspool is effectively dead when the collected sludge on the bottom and the side walls is so dense that inflow exceeds outflow of the liquid and cleaning of the pool is incapable of altering that relationship. Anaerobic bacterial action breaks down the digestible solid materials present thereby, in theory at least, extending the life of the cesspool.

In practice, however, the useful life of a cesspool is shortened considerably by what actually occurs. Anaerobic bacterial action is inefficient and appears to be relatively ineffective in digesting much of the materials which should be digested, and it is possible that some of the waste materials themselves, such as detergents and other cleaning materials, may inhibit such action. Furthermore, the operation of the cesspool itself creates conditions which reduce the percolation rate of the water with the result that very often and possibly in most cases, the pool becomes filled with liquid long before it becomes filled with solid material. This results in cesspool overflow and backup problems.

The conditions in a cesspool which reduce the percolation rate and cause the problems described above involve the tendency of the solid and semi-solid material settling out of the liquid waste to pack on the bottom in such a way as to interfere with the flow of liquid through it. The layer of this material gets thicker as it builds up and packs down under its weight. Some of the smaller and finer parts of the digested sludge intermix between the grains of sand and gravel forming the bed for the pool and this increases the density of this underlying bed thereafter further restricting draining of the liquid. Constant flow of the liquid downwardly through the sludge and gravel beneath the bottom of the pool enhances packing of the solid materials which over a period of time reduces the rate of percolation and eventually leads to cesspool overflow and backup before being filled with solid material as described above.

This problem has long been recognized and there are certain techniques in current use to cope with the situation. When a cesspool becomes filled, a suction tube may be dropped into it and the liquid removed. Also, solid material can be agitated and removed along with the liquid. Under some conditions, workers can physically penetrate the pool with tools to scrape and remove the solid materials. These procedures are generally expensive and have to be repeated at frequent intervals because the underlying conditions which inhibit drainage are not rectified, and the pool fills up rapidly with the waste liquid being discharged into it.

Another technique frequently employed to drain a pool filled with liquid is to dump large amounts of concentrated sulfuric acid through the waste line. This is quite effective when first used but subsequent treatments can result in damage to the structure of the cesspool, and repeated uses are found to become less effective. In addition, the discharge of large amounts of such acids into the ground water is frowned upon by many environmentalists. Because such acids are heavy and sink rapidly to the bottom of the pool, this material will have no effect on an overflow pool which is in common use and required by many building authorities.

Elaborate arrangements for dealing with liquid waste products are shown in U.S. Pat. Nos. 1,398,394, 3,168,595, 3,828,933 and 4,376,702. These systems are relatively complex and do not appear to be able to solve the problems described above.

SUMMARY OF THE INVENTION

The present invention overcomes or reduces many of the present problems of cesspools as described above by effectively substituting dynamic action in a cesspool for the static type of action which is typical of cesspools in general use today.

It has been found that by substituting aerobic bacterial action in the pool for the anaerobic type currently in use and physically maintaining a porous condition in the layer of solids being built up as well as in the sand and gravel base for the pool itself the life of the cesspool is extended considerably. Furthermore, as aerobic action is considered to be more effective and efficient in digesting that portion of the solid waste which is capable of such treatment, there is far less solid material in the liquid waste available for accumulating in the pool.

In this invention, there is provided an aeration system and method for bubbling up air through the pool either continuously or at intervals to prevent packing of the solid materials and so insure adequate drainage through the pool.

In preferred embodiments of this invention, there is provided a tool for implanting an aeration device under an existing cesspool. Such a tool comprises an extended hollow tube with a leading edge for penetrating the cesspool and a handle at the other end, tubes communicating with the interior of the hollow tube projecting from a side wall adjacent the leading edge and projecting forwardly past the leading edge, and arms hinged on the hollow tube adjacent the leading edge and movable between a retracted position up against the hollow tube and an expanded position where the arms are flared outwardly. A mechanism is provided to insure the arms move in unison and a rod extends from the mechanism to the handle so that the position of the arms is known to the operator. A valve is provided in the handle so that compressed air can be delivered into the hollow tube. A hose connected to the handle provides for delivery of the air under pressure.

The aeration device has a body which is inserted into the leading edge of the hollow tube of the tool and hollow flexible arms with perforations which rest on and are attached to the pivoted arms of the tool. With the arms retracted and the valve turned to permit air under pressure to enter the hollow tube the tool can be inserted down through the center of the cesspool to a point below the bottom of the pool. Compressed air emanating from the leading edge of the hollow tube, the projecting tubes, and the flexible arms agitate the solid material and permit the tool to reach the desired location easily and with little effort.

As the tool is removed the pivoted arms catch the solid material and are spread into their open position. An elastic band coupling the flexible arms to the pivoted arms is designed to snap readily so that the aeration device with a central tube extending up and out of the pool is left in place as the tool is removed from the pool. A hose is then attached to the aeration device and air is delivered to the base material beneath the pool.

Bubbling of air up through the pool at regular intervals or when needed reestablishes and maintains adequate drainage through the pool, while, in addition, the presence of oxygen in the air establishes aerobic bacterial action causing digestion and liquefaction of some of the solid material as described above. In another embodiment, a chemical additive may be added to the compressed air being delivered to the aeration device in order to enhance the bacteriological action within the pool.

It is thus a principal object of this invention to provide apparatus for aerating pools for receiving solid waste material in a liquid carrier.

Another object of this invention is a method for establishing aeration in a waste pool.

Other objects and advantages of this invention will hereinafter become obvious from the following description of preferred embodiments of this invention.

DESCRIPTION OF THE PREFERRED EMBODIMENTS

Figure 1:
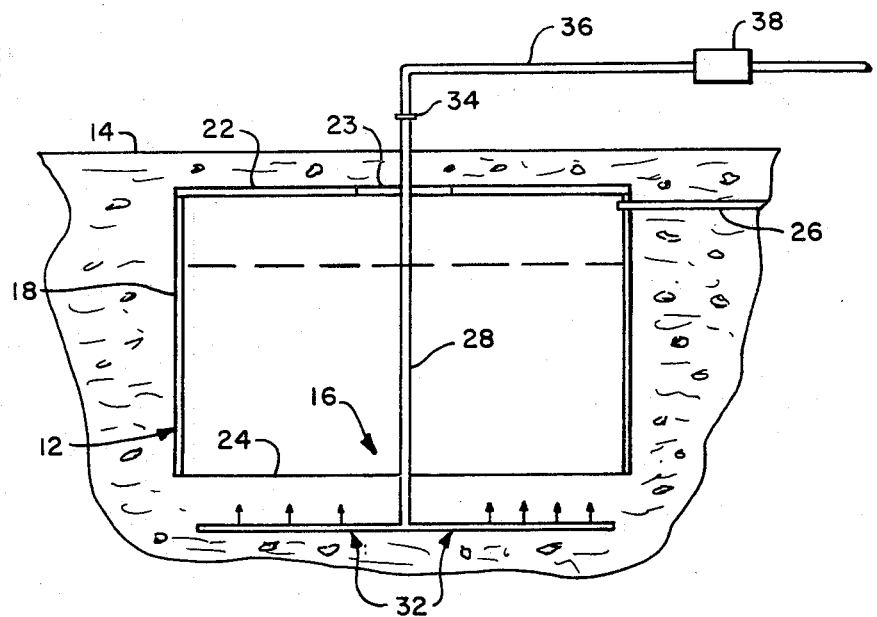
FIG. 1 is a schematized illustration of a cesspool with provision for aeration in accordance with the principles of this invention.

Referring to FIG. 1, there is illustrated a cesspool 12 mounted below ground level 14 having an aeration device 16 inserted beneath pool 12.

Cesspool 12, as is understood in the art, generally is made up of a cylindrical body 18 with a cover 22 having a removable closure 23 closing off an opening for access. Cesspool 12 is open on the bottom and inserted in the ground previously excavated to accommodate it. The earth is then backfilled against the outside of the pool and on top of cover 22, leaving cesspool 12 empty and resting on a bed 24 of gravel and sand which may be prepared for this purpose. Pool 12 may be provided with openings in side wall 18 to permit liquid to drain out through the sides although the major part of drainage is down through bed 24. A sewer line 26 empties into pool 12 as illustrated.

Figure 2:
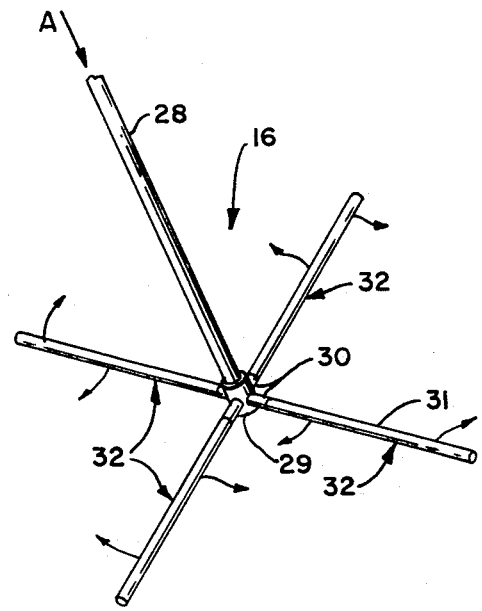
FIG. 2 is an isometric view of an aeration device.

Aeration device 16 in accordance with the principles of this invention, as seen in FIG. 2, consists of a center tube 28 extending down through closure 23 terminating in an adaptor 29 from which extends a plurality of arms 32, in this case four of them, extending at about a 90 degree angle to tube 28 when in place. Arms 32 each consists of a short flexible section 30 and a rigid section 31 with pores or a microporous plastic so that when compressed air is fed into tube 28 the air emerges from arms 32 as indicated by the arrows. Flexible sections 30, as will be seen later, makes it possible to fold up arms 32. If device 16 is installed when cesspool 12 is installed, then device 16 can be completely rigid in construction.

However, when in accordance with this invention, aeration device 16 is installed where pool 12 is already in place, in many cases years after its original installation, aeration device 16 must be constructed, as already described, so that arms 32 are foldable up against tube 28 as will be seen from the description given further below.

Referring back to FIG. 1, center tube 28 of aeration device 16 terminates at a point 34 above pool 12 where a tube or conduit 36 to the outlet of a compressor 38 is connected. Compressor 38 delivers compressed air to aeration device 16 and the air under pressure bubbles up from arms 32 through bed 24 and the liquid and the solid contents of cesspool 12 as previously described.

Figure 3:
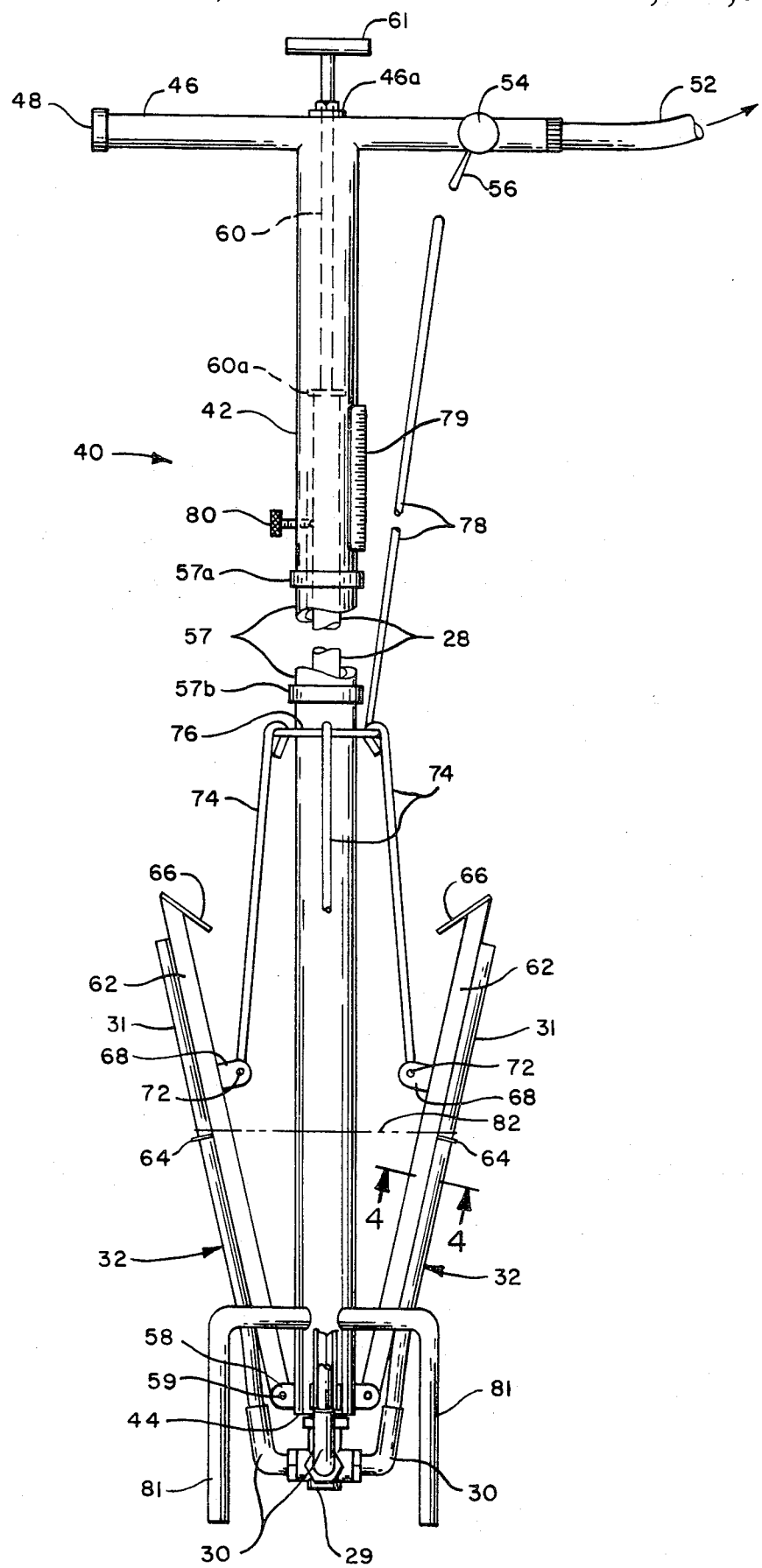
FIG. 3 is an elevation view of a tool embodying the principles of this invention in a partially retracted position with an aeration device mounted.

In order to install aeration device 16 into an existing cesspool, a special tool embodying principles of this invention is utilized. Referring to FIG. 3 for details of the tool, it is seen that tool 40 consists of an elongated metal cylinder 42 open at its bottom end 44 and terminating at its upper end in handle 46. Handle 46 is a hollow member, communicating with cylinder 42, closed at one end by a cap 48, and adapted at its other end to be connected to an air hose 52 which is connected to a compressor for the delivery of compressed air to cylinder 42. Mounted on handle 46 is a valve 54 operated by a lever 56. By operation of the latter, delivery of compressed air to tool 40 may be controlled by the operator at handle 46 as he uses the tool.

The length of cylinder 42 is adjusted by the insertion and removal of sections 57 and adapters 57a and 57b. Passing through a compression fitting 46a in handle 46 into cylinder 42 is a push rod 60 with a stop 60a on the bottom which can be moved up and down by manipulating as other end for a purpose to be described later.

Figure 4:
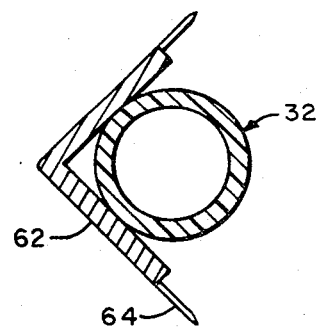
FIG. 4 is a view along 4—4 of FIG. 3.

Adjacent the bottom of cylinder 42 are four equally spaced brackets 58 with pins 59 on which four arms 62 are mounted at one for pivoting. Each arm 62 is V-shaped in cross section as seen in FIG. 4 for a purpose which will later become obvious and is provided with a pair of spikes 64 and a flat plate 66 at its other end. Any other cross section of arms 62, such as dished, may be employed as long as it is able to perform the function to be described below. A bracket 68 with a pin 72 pivotally supports one end of a rod 74 on each arm 62 and at its other end is pivotally attached to a floating ring 76 surrounding cylinder 42. From this arrangement it is seen that movement of ring 76 along the length of cylinder 42 will both cause arms 62 to move outwardly or inwardly in unison, and indicate to the operator the position of arms 62. Moving ring 76 upwardly will cause arms 62 to retract against cylinder 42. For a purpose which will later become obvious spikes 64 are each provided with a sharp edge facing upwardly. In order to determine the position of ring 76 from handle 46, an extended rod 78 is provided with one end attached in any convenient fashion to ring 76 and directed parallel to and along the length of cylinder 42, terminating at some point convenient to handle 46.

Adjacent the free end of rod 78 is an index plate 79 on cylinder 42 which indicates to the operator by the position of the free end of rod 78 along plate 79 the location of ring 76 and hence the position of arms 62. Rods 78 may be provided with add on sections to compensate for the addition of one or more sections 57 to cylinder 42.

In order to mount aeration device 16 on tool 40, center tube 28 is inserted into cylinder 42 from the bottom as far as it will be able to travel. A locking screw 80 threaded through a side wall of cylinder 42 is used to hold tool 16 firmly in place.

Arms 32 of device 16 are bent upwardly as illustrated in FIG. 3 and each arm is fitted into the depression shaped in each arm 62. An elastic member or rubber band 82 is pulled over the bottom of tool 40 and placed as illustrated at the locations of spikes 64 which perform the function to hold these bands in place. With arms 62 fully retracted against cylinder 42, tool 40 is ready to be utilized to place aeration device 16 in place beneath cesspool 12.

A plurality of tubes 81 communicating with the inside of cylinder 42 come out of the latter and are bent to terminate with open ends below the bottom end 44 of cylinder 42.

In order to use tool 40 to place aeration device 16 below cesspool 12 as shown in FIG. 1, tool 40 with device 16 mounted as in FIG. 3 with arms fully retracted against cylinder 42 is raised above the ground. As is understood in the art a tripod or other suitable crane-like device may, if desired, be used to support tool 40 in its raised position.

The ground above closure 23 is excavated and the latter is removed. Tool 40 is lowered until it rests on the solid material on the bottom of pool 12. Air valve 54 is then opened so that compressed air entering handle 46 passes down into cylinder 42, around and through center tube 28. The air passing around tube 28 leaves cylinder 42 through its bottom opening and out through tubes 81. The air entering center tube 28 enters arms 32 and leaves through the pores or other openings along their length. Compressed air coming out of the bottom of cylinder 42 and tubes 81 agitates the solid material so that very little effort is required for the tool to pass through the bottom of pool 12. The tool is lowered until it reaches a point where bottom 44 is about 60 inches below the bottom of pool 12. This can be readily determined by using a dip stick to measure the distance to the bottom of the pool whereas the length of cylinder 42 and its sections 57 are already known.

When tool 40 comes to rest at the desired depth, the rate of compressed air flow can be reduced by partially closing valve 54. Tool 40 is then raised using the tripod and a suitable chain drive to gain a mechanical advantage. Plates 66 offer resistance to movement in the sand and gravel base causing arms 62 to spread as cylinder 42 is raised, requiring in many cases a substantial force to raise tool 40. As arms 62 spread, rubber band 82 become taut, and the knife edges of spikes 64 cut the band. Eventually arms 62 with arms 32 of device 16 become fully extended at substantially right angles of cylinder 42 as is indicated by the position of the end of rod 78 along plate 79. Locking screw 80 is then loosened and T-member 61 on rod 60 pushed downwardly to loosen device 16 from tool 40. Arms 62 continue to rotate downwardly as tool 40 is raised with arms 62 ultimately extending down as tool 40 is raised above ground level. Withdrawal of tool 40 leaves aeration device 16 in place as shown in FIG. 1 with the free end of tube 28 being at some predetermined convenient location, usually just above ground level as seen in FIG. 1. Then hose 36 is connected to tube 28 so that compressed air from the compressor can be delivered whenever desired. Cover 23, with a hole to accommodate tube 28, is replaced (prior to attaching hose 36) and the earth is backfilled above cesspool 10.

The distance at which aeration device 16 is placed below cesspool 12 is not critical except that it should be at least eighteen inches below pool 12. To obtain this positioning of device 16, when using tool 40, it has been found that its leading edge should be lowered to about five or six feet below pool 12. Then it rises about three feet before arms 62 are spread out at right angles to cylinder 42. When tool 40 is finally removed, device 16 is found to be somewhere between eighteen inches and three feet below its pool.

The length of arms 32 is also not critical. For a pool eight feet in diameter an optimum length for each arm 62 is about seventeen inches. This is the shortest length which produces sufficient diffusion of the air leaving the arms to aerate the whole pool. A greater length is not necessary but does require a tool 40 with longer arms 62 and thus a much heavier tool.

It should also be noted that arms 32 are hollow and are plugged at their ends to insure that the air diffuses through openings or pores in the walls of the arms. A microporous plastic, available commercially, has been found to be suitable for the rigid sections 31 of arms 32.

It is understood that compressor 38 can be manually controlled to deliver air continuously or at regular intervals to the aeration device 16, much like the control of an automatic sprinkling system using a timer.

In addition, control over delivery of compressed air to the pool may be exercised based upon the level of liquid within.

Such a system, illustrated schematically in FIG. 5, includes a below-ground cesspool 112 containing solid and liquid waste 114 and having mounted for use an aeration device 116 as previously described whose center tube 128 is connected to a compressor 130 through a line 132.

A three wire level indicator strip 134 is located on tube 128 extending from the top of the inside of pool 112 to some convenient intermediate point in the pool. Strip 134, as is understood in the art, consists of a center common conductor running the full length, a second conductor running the full length, and a third conductor extending a short distance down from the top of pool 112. When the level of liquid 114 reaches indicator strip 134, an electrical connection is made between the first conductor and the common conductor. When the level reaches the third conductor then there is also conduction between the third conductor and the common conductor.

Figure 5:
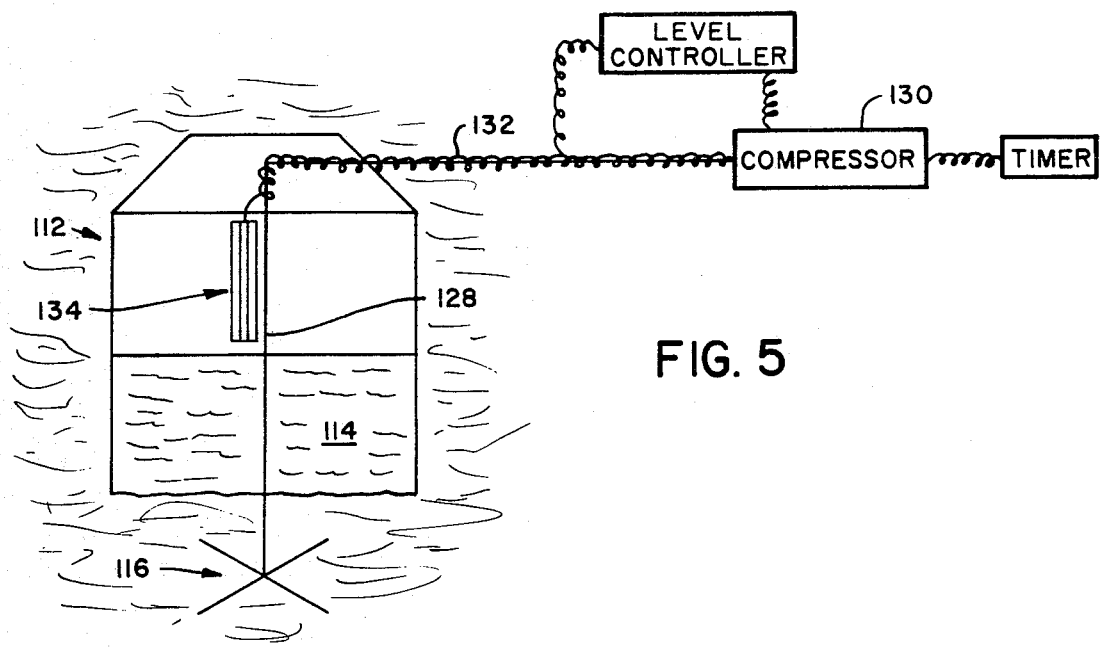
FIG. 5 is a schematic illustration of a liquid level control system for the operation of the aeration device.

There are several modes of operation to select from in this system shown in FIG. 5. In one mode, when the level of liquid 114 reaches the third conductor, compressor 130 can start to operate and not stop until the level drops below strip 134. In another mode, when the level reaches the first conductor, compressor 130 can operate at less than capacity, and should the level continue to rise, compressor operation can be increased when the level reaches the third conductor. This type of level indicator and control as a system by itself is conventional and readily available.

Apparatus for installing and operating equipment for aerating a pool has been described in connection with a single pool. In many cesspool installations it is not unusual to have a cesspool with an overflow pool. In such a case, aeration device 16 or 116 would preferably be installed under the overflow pool in a one pool installation, or, if desired, aeration devices could be installed under both pools. In the case of multipool installations of the aeration device, which would include not only a pool with an overflow, but also two or more pools from different users such as what might be found in a commercial installation, it is possible to employ a single compressor to service all of the cesspools.

Figure 6:
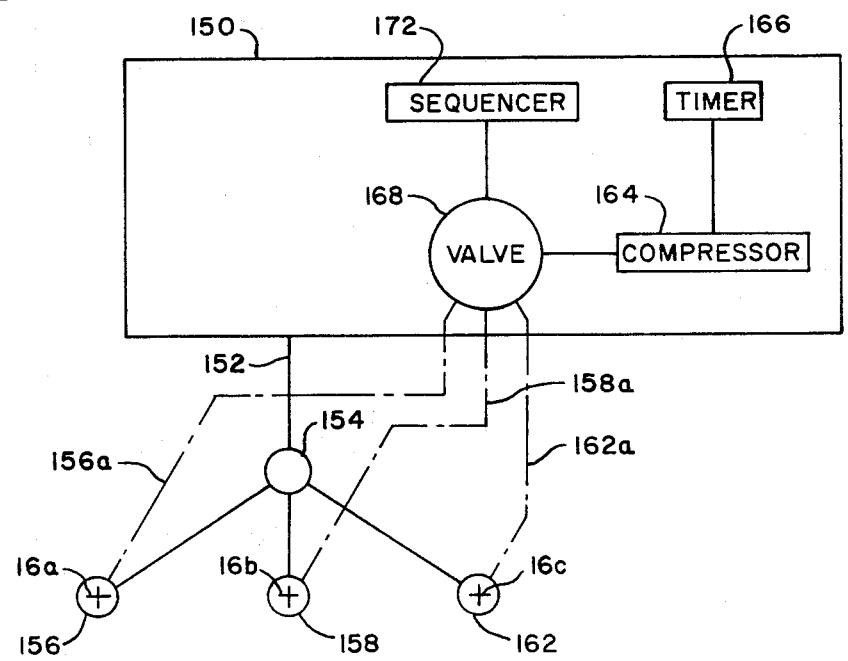
FIG. 6 illustrates schematically a multi-pool arrangement embodying the principles of this invention.

Referring to FIG. 6, for such an installation, there is shown a building or buildings 150 having a common waste line 152, a cesspool 154, and three overflow pools 156, 158, and 162 containing aeration devices 16a, 16b, and 16c, supplied by air lines 156a, 158a, and 162a, respectively. A compressor 164 under control of a timer 166 supplies air to a three position valve 168 under control of a sequencer 172. In the operation of this system, timer 166 turns on compressor 164 to operate for a few preselected hours each day or other period desired. The compressed air is delivered to valve 168 which has three outlet positions, one to each of lines 156a, 158a, and 162a. Under the control of sequencer 172, the valve 168 is positioned to deliver to each of the lines one at a time compressed air to the three aeration devices. The valve and control devices just referred to are by themselves well known in the art and commercially available.

One of the advantages of the aeration systems herein described is the ability to deliver chemical additives to a cesspool in a more effective fashion than just dumping the chemicals in the pool because of the thorough distribution throughout the pool which takes place in the aeration systems just described and also to make the insertion automatically without the necessity of opening the pool.

Figure 7:
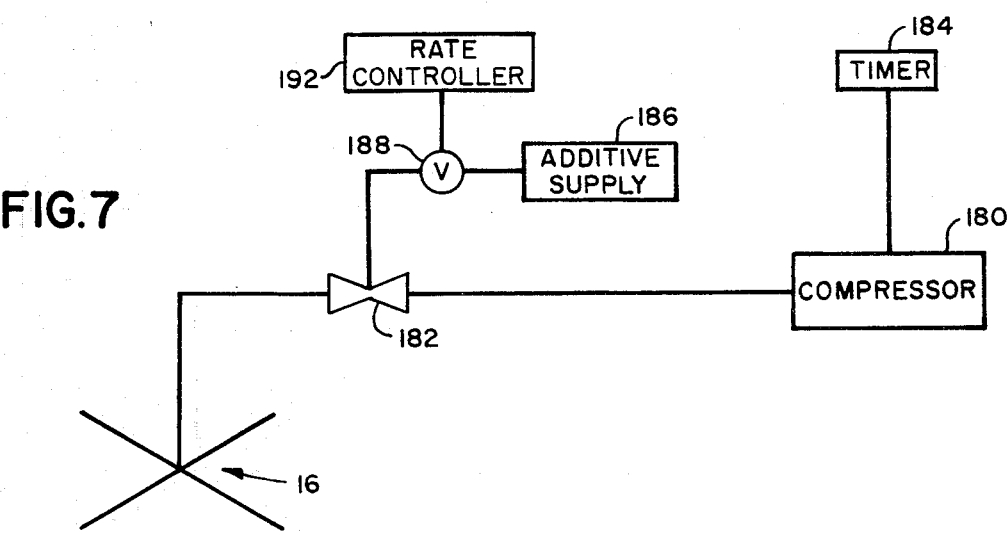
FIG. 7 shows schematically the addition of an additive to a pool in which aeration is conducted according to the principles of this invention.

One such system, referring to FIG. 7, shows aeration device 16 connected to compressor 180 through a venturi feeding device 182 and under control of a timer 184. The chemical additive, which may be any one of a number of enzymes found to stimulate aerobic bacterial action within a cesspool, is supplied from a source 186 through a valve 188 under control by a rate controller 192 for setting the rate at which the additive is supplied. As is understood in the art, the additive is carried by the compressed air either in a mist form, or gaseous, depending on the nature of the additive. Venturi device 182, as well as rate controller 192, is well known in the art and such devices are available commercially.

It is thus seen that there has been provided systems and methods for the aeration of cesspools, and devices and methods for inserting aeration devices under existing pools. While a variety of certain specific preferred embodiments of this invention have been described, it is understood that many other variations and changes in such systems, devices, and methods are possible without departing from the principles of this invention as defined in the claims which follow.

What is claimed is:

1. A tool for implanting aeration apparatus beneath a pool for collecting waste material in a liquid carrier, comprising:
   a. an extended hollow tube having an open leading edge at one end and a handle closing off the other end;
   b. means extending from the side of said hollow tube adjacent said leading edge and projecting past said leading edge for communicating with the interior of said hollow tube;
   c. means pivotally mounted on said tube adjacent said leading edge for supporting said aeration apparatus, said pivotally mounted means comprising a plurality of arms hinged on said hollow tube and pivoting about 180° between a retracted position folded in against said hollow tube and a position whereby said arms are projected forward of said hollow tube;
   d. said aeration apparatus comprising a center tube entering said open leading edge of and extending up through said tube and aerating arms communicating with the bottom of said center tube and nestled against the outwardly facing sides of said hinged arms; and
   e. means for controlling the flow of compressed air through said handle into said hollow tube, into said aeration apparatus and out said leading edge and said extending means.

2. The tool of claim 1 in which said extending means comprises tubes extending out from the side of said hollow tube and bent to be substantially parallel with the axis of said hollow tube.

3. The tool of claim 2 in which each of said hinged arms has a cross section shaped to cradle an aeration arm.

4. The tool of claim 3 in which said hollow tube is provided with means to lock in place the aerating arms of said aeration apparatus when installed on said tube.

5. The tool of claim 5 having means on said arms to support an elastic band to hold said aeration arms of said aeration apparatus in place on said hinged arms.

6. The tool of claim 6 in which the support means is provided with means to sever said band as said hinged arms are rotated outwardly.

7. A method for implanting an aeration device in the ground beneath a cesspool comprising the steps of:
   a. mounting said device on a tool having arms in a retracted position to which said tool is engaged,
   b. supplying air under pressure to said tool, said tool having means to project said compressed air forwardly;
   c. lowering said tool through the bottom of said pool and into the ground surface beneath said pool, said compressed air being projected acting to agitate the material into which said tool is being lowered thereby facilitating movement of said tool;
   d. upon reaching a preselected depth for said tool, raising said tool, the solid material in which said tool is buried causing said arms to spread and release said aeration device; and
   e. retracting said tool causing said arms to rotate until said arms extend down leaving said aeration device in position below said pool to deliver air under pressure to aerate said pool.

* * * * *

UNITED STATES PATENT AND TRADEMARK OFFICE
CERTIFICATE OF CORRECTION

PATENT NO. : 4,494,616

DATED : January 22, 1985

INVENTOR(S) : George B. McKee

Page 1 of 2

It is certified that error appears in the above-identified patent and that said Letters Patent is hereby corrected as shown below:

Insert columns 5 and 6 as part of Letters Patent as shown on the attached sheet.

Signed and Sealed this

Tenth Day of December 1985

[SEAL]

Attest:

Attesting Officer

DONALD J. QUIGG

Commissioner of Patents and Trademarks any convenient fashion to ring 76 and directed parallel to and along the length of cylinder 42, terminating at some point convenient to handle 46.

Adjacent the free end of rod 78 is an index plate 79 on cylinder 42 which indicates to the operator by the position of the free end of rod 78 along plate 79 the location of ring 76 and hence the position of arms 62. Rods 78 may be provided with add on sections to compensate for the addition of one or more sections 57 to cylinder 42.

In order to mount aeration device 16 on tool 40, center tube 28 is inserted into cylinder 42 from the bottom as far as it will be able to travel. A locking screw 80 threaded through a side wall of cylinder 42 is used to hold tool 16 firmly in place.

Arms 32 of device 16 are bent upwardly as illustrated in FIG. 3 and each arm is fitted into the depression shaped in each arm 62. An elastic member or rubber band 82 is pulled over the bottom of tool 40 and placed as illustrated at the locations of spikes 64 which perform the function to hold these bands in place. With arms 62 fully retracted against cylinder 42, tool 40 is ready to be utilized to place aeration device 16 in place beneath cesspool 12.

A plurality of tubes 81 communicating with the inside of cylinder 42 come out of the latter and are bent to terminate with open ends below the bottom end 44 of cylinder 42.

In order to use tool 40 to place aeration device 16 below cesspool 12 as shown in FIG. 1, tool 40 with device 16 mounted as in FIG. 3 with arms fully retracted against cylinder 42 is raised above the ground. As is understood in the art a tripod or other suitable crane-like device may, if desired, be used to support tool 40 in its raised position.

The ground above closure 23 is excavated and the latter is removed. Tool 40 is lowered until it rests on the solid material on the bottom of pool 12. Air valve 54 is then opened so that compressed air entering handle 46 passes down into cylinder 42, around and through center tube 28. The air passing around tube 28 leaves cylinder 42 through its bottom opening and out through tubes 81. The air entering center tube 28 enters arms 32 and leaves through the pores or other openings along their length. Compressed air coming out of the bottom of cylinder 42 and tubes 81 agitates the solid material so that very little effort is required for the tool to pass through the bottom of pool 12. The tool is lowered until it reaches a point where bottom 44 is about 60 inches below the bottom of pool 12. This can be readily determined by using a dip stick to measure the distance to the bottom of the pool whereas the length of cylinder 42 and its sections 57 are already known.

When tool 40 comes to rest at the desired depth, the rate of compressed air flow can be reduced by partially closing valve 54. Tool 40 is then raised using the tripod and a suitable chain drive to gain a mechanical advantage. Plates 66 offer resistance to movement in the sand and gravel base causing arms 62 to spread as cylinder 42 is raised, requiring in many cases a substantial force to raise tool 40. As arms 62 spread, rubber band 82 become taut, and the knife edges of spikes 64 cut the band. Eventually arms 62 with arms 32 of device 16 become fully extended at substantially right angles of cylinder 42 as is indicated by the position of the end of rod 78 along plate 79. Locking screw 80 is then loosened and T-member 61 on rod 60 pushed downwardly to loosen device 16 from tool 40. Arms 62 continue to rotate downwardly as tool 40 is raised with arms 62 ultimately extending down as tool 40 is raised above ground level. Withdrawal of tool 40 leaves aeration device 16 in place as shown in FIG. 1 with the free end of tube 28 being at some predetermined convenient location, usually just above ground level as seen in FIG. 1. Then hose 36 is connected to tube 28 so that compressed air from the compressor can be delivered whenever desired. Cover 23, with a hole to accommodate tube 28, is replaced (prior to attaching hose 36) and the earth is backfilled above cesspool 10.

The distance at which aeration device 16 is placed below cesspool 12 is not critical except that it should be at least eighteen inches below pool 12. To obtain this positioning of device 16, when using tool 40, it has been found that its leading edge should be lowered to about five or six feet below pool 12. Then it rises about three feet before arms 62 are spread out at right angles to cylinder 42. When tool 40 is finally removed, device 16 is found to be somewhere between eighteen inches and three feet below its pool.

The length of arms 32 is also not critical. For a pool eight feet in diameter an optimum length for each arm 62 is about seventeen inches. This is the shortest length which produces sufficient diffusion of the air leaving the arms to aerate the whole pool. A greater length is not necessary but does require a tool 40 with longer arms 62 and thus a much heavier tool.

It should also be noted that arms 32 are hollow and are plugged at their ends to insure that the air diffuses through openings or pores in the walls of the arms. A microporous plastic, available commercially, has been found to be suitable for the rigid sections 31 of arms 32.

It is understood that compressor 38 can be manually controlled to deliver air continuously or at regular intervals to the aeration device 16, much like the control of an automatic sprinkling system using a timer.

In addition, control over delivery of compressed air to the pool may be exercised based upon the level of liquid within.

Such a system, illustrated schematically in FIG. 5, includes a below-ground cesspool 112 containing solid and liquid waste 114 and having mounted for use an aeration device 116 as previously described whose center tube 128 is connected to a compressor 130 through a line 132.

A three wire level indicator strip 134 is located on tube 128 extending from the top of the inside of pool 112 to some convenient intermediate point in the pool. Strip 134, as is understood in the art, consists of a center common conductor running the full length, a second conductor running the full length, and a third conductor extending a short distance down from the top of pool 112. When the level of liquid 114 reaches indicator strip 134, an electrical connection is made between the first conductor and the common conductor. When the level reaches the third conductor then there is also conduction between the third conductor and the common conductor.

There are several modes of operation to select from in this system shown in FIG. 5. In one mode, when the level of liquid 114 reaches the third conductor, compressor 130 can start to operate and not stop until the level drops below strip 134. In another mode, when the level reaches the first conductor, compressor 130 can operate at less than capacity, and should the level continue to rise, compressor operation can be increased when the level reaches the third conductor. This type of